Nov. 18, 1969 T. A. COOTEY ET AL 3,478,532
ELECTRONIC HEAD PRESSURE CONTROL FOR CONDENSING UNITS
Filed Aug. 5, 1964
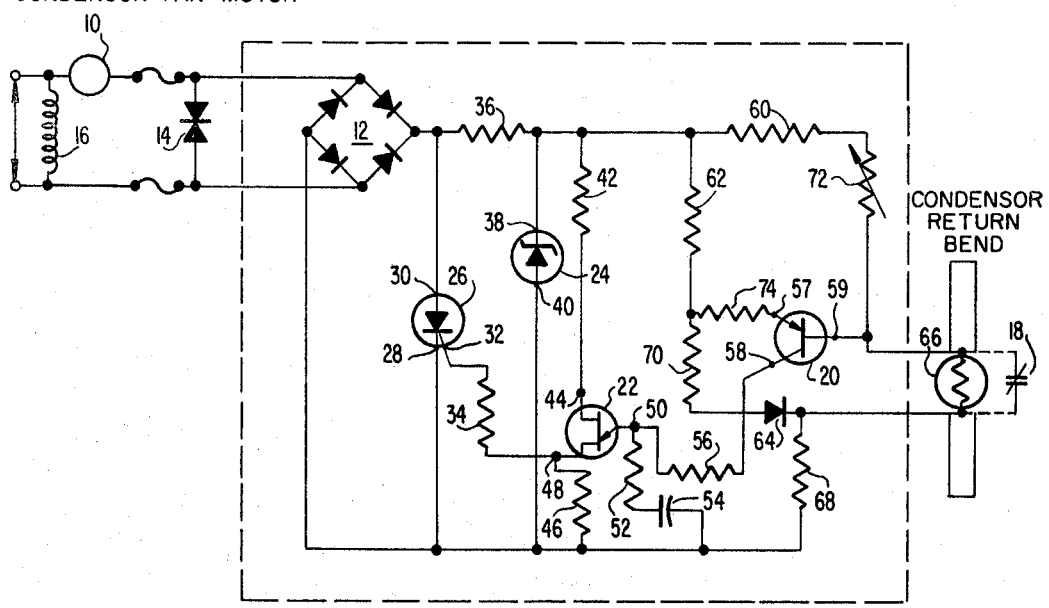
INVENTOR.
THOMAS A. COOTEY
LARRY M. FISCHER
BY
ATTORNEYS

United States Patent Office 3,478,532
Patented Nov. 18, 1969

3,478,532
ELECTRONIC HEAD PRESSURE CONTROL FOR CONDENSING UNITS
Thomas A. Cootey and Larry M. Fischer, San Antonio, Tex., assignors to Friedrich Refrigerators, Incorporated, San Antonio, Tex., a corporation of Texas
Filed Aug. 5, 1964, Ser. No. 387,821
Int. Cl. F25b 39/04
U.S. Cl. 62—184                                    11 Claims This invention relates to a control system employed in refrigerating systems having air cooled condensers.

Many of the present day refrigeration systems utilize air-cooled condensers and quite frequently the condenser is located out of doors and is, therefore, subjected to wide variations of ambient temperatures, from a high during the hot seasons to a low during the cold seasons. Consequently, if the condensing pressure were not regulated by some means, then the changing ambient conditions would produce corresponding changes in the condensing pressure resulting in poor control of the feed of liquid refrigerant from the high side to the low side of the refrigeration system.

Various devices have been proposed to overcome the poor operational characteristics which result from the fluctuations in the ambient. One such device utilizes the movable louver principle to control the passage of air over the heat exchange surface of the condenser. Another type of device utilizes a pressure control or thermostat to sense changes in the ambient and thereby activates or deactivates a source of forced air flow.

When louvers are employed as the control device, optimum control is generally not achieved. Louvers have to be specifically designed for the unit involved; they are subjected to frequent breakdown; and the initial cost of the system is high. When pressure control thermostats are utilized to cycle a condenser fan on or off in accordance with changes in the ambient, problems are generally encountered in that the operation of such controls cause the fan motor to cycle on and off with corresponding fluctuations in condensing pressure.

The chief object of the present invention is to provide a control system for air cooled condensers wherein the effect of return air over the condenser coils is sensed by a temperature sensor attached in heat exchange relationship to one of the return bends of the condenser coil and is utilized to provide a modulating signal output in exact proportion to a temperature change to regulate the speed of a fan motor in substantially direct proportion to all operating temperatures that may be experienced by the refrigerating system.

A further object of the invention is to provide a control system that will maintain the condenser fan motor in continuous operation when the return air is at some predetermined high level and will maintain the condenser fan in continuously off position when return air is at some predetermined low level.

A further object of the invention is to provide a control system that is easy to install, compact, inexpensive, and has only two moving parts.

With the above and other objects in view, as will hereinafter appear, the invention comprises the devices, combinations and arrangements of parts hereinafter set forth and illustrated in the accompanying drawing of a preferred embodiment of the invention.

The single figure of the drawing is a schematic wiring diagram of a temperature sensitive motor control system embodying the invention.

Referring now to the drawing, there is shown therein a suitable source of alternating current power, such as a 230 volt 60 cycle line acting as a supply to a fan motor 10 and to the control system embodying the invention.

The fan motor 10 is located in series with one of the supply lines and a bridge rectifier circuit 12. Although it is not necessary to the invention, it was found to be convenient to place a thyrector 14 across the AC lines in that the thyrector will shunt transient voltages and thus prevent such voltages from affecting the operation of the control system.

In the preferred embodiment of the invention a time delay relay 16 has been placed across the AC line. The contacts 18 for this relay are located in shunt with the temperature sensing device. The relay was included for the purpose of shunting the temperature sensor during warm up.

As stated previously, a bridge rectifier circuit 12 converts the alternating current power into a pulsating DC to act as a supply of DC voltage to the circuits embodying the control.

The control circuit consists of four transistorized stages. The first stage consists of a PNP transistor 20 and its associated circuitry. This stage constitutes the temperature setting and sensing circuit to supply a signal output in response to a change in the temperature of the cooling air flow as it passes over the condensing coils. The second stage includes a unijunction transistor 22 and its associated circuitry which constitutes an oscillating or timing means responding to the signals produced by the first stage to control the conduction of a later stage. Basically this stage is a relaxation oscillator. The third stage includes a Zener diode 24 and its associated circuitry and constitutes a voltage limiting means to insure that a constant level of pulsating DC is maintained at both the unijunction transistor second stage and the temperature sensing first stage. The fourth stage consists of a silicon controlled rectifier 26 that has its period of conduction controlled by the firing of the unijunction transistor oscillating stage. The silicon controlled rectifier as a conducting stage may be defined as the control stage for the alternating current motor 10.

The silicon controlled rectifier 26 is connected across the output terminals of the bridge rectifier 12. The cathode 28 of the SCR is tied to the negative terminal of the bridge rectifier and the anode 30 of the silicon controlled rectifier is connected to the positive terminal of the bridge rectifier. The gate 32 of the SCR is connected to a resistor 34 which appears in the output circuit of the relaxation oscillator.

The positive terminal of the bridge rectifier 12 is also connected to a voltage dropping resistor 36 to reduce the potential applied to the remaining three stages and to limit the current flow through the zener diode 24.

The remaining transistorized stages of the invention are all connected in series parallel to the low side of the resistor 36.

The cathode 38 of the Zener diode 24 is connected to the bottom of 36 and the anode 40 is connected to the negative return of the DC supply. Thus, the Zener diode acts as a voltage limiting device to maintain the level of DC potential applied to the oscillating and sensing stages at a constant level.

The UJT relaxation oscillator is connected to the low side of the voltage dropping resistor 36 through the voltage temperature compensating resistor 42 which compensates for any operating temperature increase of the UJT. The other side of the oscillator is connected to the negative side of the DC supply through a voltage limiting resistor 46 which is connected to the base 48 of the UJT. The output of the relaxation oscillator is connected to the gate 32 of the silicon controlled rectifier from the base 48 of the UJT through an output resistor 34. The emitter 50 of the unijunction transistor is returned to the negative side of the DC supply through a resistor 52 in series with a capacitor 54. The emitter of the UJT is also connected in series with the collector 58 of the transistor 20 located in the temperature sensing circuit, through a resistor 56.

The circuit consisting of the collegtor 58 of the transistor 20, the resistor 56, the resistor 52, and the capacitor 54 constitutes an RC circuit, the time constant of which determines the period of oscillation of the relaxation oscillator.

In the absence of any charge on the capacitor 54, only a small leakage current will flow between the double bases of the UJT. This leakage current is so small that it does not produce a sufficient output voltage to fire the silicon controlled rectifier. In the event that the capacitor 54 obtains a charge suffcient to forward bias the emitter 50 of the UJT, then the unijunction transistor will fire and a capacitive discharge circuit comprising the capacitor 54, the resistor 52, the emitter, base 48, and resistor 46 in parallel with the resistance 34 in series with the path consisting of the gate 32 to cathode 28 of the silicon control rectifier will be established.

In the preferred embodiment of this invention the temperature sensing and signal producing section of the control system consists of an unbalanced bridge circuit. The terminal of the bridge circuit is connected at the junction of resistors 60, 62, 42 and the low side of 36. The opposite terminal of the bridge circuit is connected to the junction of a diode 64, a thermistor 66, the normally closed contacts of the time delay relay 18, and the high side of a voltage dropping resistor 68. The other side of the voltage dropping resistor is returned to the negative side of the DC supply.

One leg of the bridge circuit consists of the resistor 62; a second leg of the circuit, connected in series with the first leg, consists of the series combination of a resistor 70 and the diode 64. These two legs act as a voltage divided to provide a bias voltage for the emitter 57 of the PNP transistor connected across the remaining two terminals of the bridge. The diode 64 serves to prevent reverse current flow in the second leg of the bridge circuit. This was found necessary in that under some conditions the sum of voltages around the loop would create a reverse voltage in the direction of the bridging leg.

The third leg of the bridge circuit consists of a voltage dropping resistor 60 in series with a rheostat 72. In the preferred embodiment of this invention the resistor 72 is preset in a sealed condensing unit and normally would not be changed by a user of the unit. The resistor 72 is set for the minimum condensing temperature for which the heat exchanger is designed to operate under optimum conditions.

The fourth leg of the bridge circuit consists of a temperature sensor 66 connected in parallel to the normally closed contacts 18 of the time delay relay 16 and in series with the third leg of the bridge circuit. A thermistor has been shown as the temperature sensor although any device that reacts negatively with a change in temperature may be used in substitution.

The bridge of the signal producing stage consists of a resistor 74 connected in series with the emitter 57 of the PNP transistor 20. The resistor 74 is connected to the junction of the first and second legs of the bridge circuit and the base 59 of the transistor 20 is connected to the junction of the third and fourth legs of the bridge circuit. The collector 58 of the transistor is connected to the resistor 56 and acts as the output for the transisor.

The operaion of the control system is as follows: Let it be assumed that the ambient temperature is about 110° F., in which case the resistance of the thermistor is very small and consequently, the voltage appearing at the base 59 of the transistor 20 is also small. Under these conditions a large charging current will flow through the charging circuit consisting of the resistors 56, 52 and the capacitor 54 in which event the relaxation oscillator will be fired very rapidly thus causing almost continuous conduction of the silicon controlled rectifier. This being the case, current will flow in the fan motor 10 for approximately 360° of an input cycle of AC current.

Now assuming that the temperature decreases to some level lower than 110° F., the resistance of the thermistor 66 will increase in proportion to the decrease in temperature and, therefore, the voltage appearing at the base 59 of the PNP transistor will also increase in proportion to the decrease in temperature. As the voltage on the base of the PNP device increases, current flow through the transistor will decrease and thus it will take a longer amount of time for the capacitor 54 to charge. The slower charging of the capacitor 54 means that the relaxation oscillator will not fire as rapidly as in the case of a 110° F. ambient. Thus firing pulses supplied to the silicon controlled rectifier 26 will be less for a given period of time and hence, this rectifier will conduct for a proportionately lower amount of time in the 360° of any input cycle of AC power to the fan motor 10. Thus energy will be supplied to the fan motor for some proportionately lesser degree of time than the full 360° of each cycle of AC power input to the fan and, therefore, the motor will coast during these periods of no energy input. This means that the fan motor will operate at a lower speed and hence provide less cooling air to the condenser. It is possible with this control system to reduce the SCR firing angle to 0° in which case the fan motor will not be energized during any part of the input cycle. It will thus be seen that a control system has been provided that will yield a constant condensing pressure throughout the entire range in which refrigeration systems may be expected to operate. This system provides a true modulating control for the fan motor and thus the amount of air passing over the condensing coil in direct proportion to change in the return air temperature.

While a specific embodiment of the invention has been shown and described, the invention should not be limited to the particular structure shown and described. It is intended, by the appended claims, to cover all modifications within the spirit and scope of the invention.

What is claimed as new and desired to be secured by Letters Patent of the United States is:

1. A control system for regulating within predetermined limits the condensing pressure in a fan motor cooled refrigerant condenser, comprising:
   (1) sensor means to sense changes in the temperature of the condenser;
   (2) signal generating means connected to said sensor means to produce electrical signals proportional to the temperature of the condenser;
   (3) an oscillator circuit, connected to and having its period of oscillation controlled by said signal generating means; and
   (4) switching means connected to the fan motor and connected to and controlled by said oscillator so that the period of conduction of said switching means is determined by the period of oscillation of said oscillator.

2. A control system for regulating within predetermined limits the condensing pressure of a fan cooled refrigerant condenser, comprising in combination with the fan cooled condenser:
   (1) a thermistor attached in heat exchange relation with said condenser;
   (2) an unbalanced electrical bridge circuit including said thermistor as one leg of said bridge;
   (3) means including a transistor device connected across said bridge to produce electrical signals from said device in proportion to the temperature of said condenser;
   (4) a relaxation oscillator;
   (5) an RC charge circuit connected to said oscillator and controlled by the collector current of said transistor device to control the period of oscillation of said relaxation oscillator; and (6) a silicon controlled rectifier connected to said fan motor and also connected to and controlled by said relaxation oscillator so that the period of conduction of said silicon controlled rectifier is determined by the period of oscillation of said relaxation oscillator.

3. A control system for regulating within predetermined limits the condensing pressure on a fan cooled refrigerant condenser according to claim 1 wherein said signal generating means comprises an unbalanced electronic bridge circuit.

4. A control system for regulating within predetermined limits the condensing pressure in a fan cooled refrigerant condenser according to claim 3 wherein one leg of said bridge circuit comprises means to preset the condensing temperature operating limits within which the control system will operate.

5. A control system for regulating within predetermined limits the condensing pressure of a fan cooled refrigerant condenser according to claim 3 wherein one of the legs of the said bridge circuit comprises a thermistor.

6. A control system for regulating within predetermined limits the condensing pressure of a fan cooled refrigerant condenser according to claim 3 including a resistor and a PNP transistor, said resistor being connected in series with the emitter of said transistor and in which the base of said transistor is connected to said means for presetting the condensing temperature operating point and a thermistor, and in which the collector of said PNP device constitutes the output terminal of said bridge circuit.

7. A control system for regulating within predetermined limits the condensing pressure in a fan cooled refrigerant condenser comprising in combination with said fan:
(1) a thermistor attached to said condenser in heat exchange relation therewith;
(2) an unbalanced electrical bridge circuit wherein one of the legs of said bridge comprises an adjustable resistor to preset the condensing temperature operating points, a second leg of said bridge comprises said thermistor, and a three terminal transistor device connected across said bridge and having its base connected between said adjustable resistor and said thermistor, and its emitter connected to a junction between the third and fourth legs of said bridge circuit, and having a collector as an output terminal for said bridge circuit;
(3) a relaxation oscillator of the double-base type;
(4) an RC charge circuit including a condenser and two resistors, one of said resistors being connected to the collector of said three terminals transistor;
(5) means connecting the emitter of said oscillator to the junction of said two resistors in said charge circuit; and
(6) a silicon controlled rectifier in series with said fan motor and having its gate connected to one of the bases of said oscillator.

8. A refrigeration system comprising a condenser; a fan arranged for passing air over said condenser to condense refrigerant therein; a fan motor arranged to drive said fan, switch means arranged to control the passage of current though said fan motor, said switch including actuating means to actuate said switch to a conducting state; temperature responsive means disposed in heat exchange relation with said condenser; means providing to said actuating means a control signal which is a function of time and sensed temperature to periodically actuate said switch to a conducting state; and means to periodically actuate said switch to a non-conducting state, so as to limit the effective power supplied to said motor to a value which results in a fan speed which provides at least a predetermined desired minimum condenser temperature.

9. A refrigeration system comprising a refrigerant condenser; a fan arranged to pass air over said condenser to condense refrigerant therein; an electric motor arranged to drive said fan, said motor being connected to a source of alternating current energy; and means to adjust said fan speed to adjust the condensing temperature of said system comprising switch means arranged to control the effective power supplied to said fan motor from said alternating current source, said switch being sufficiently fast in operation to permit control of the duration of current from said alternating current energy source to said fan motor during each cycle of alternating current, a temperature sensor disposed in heat exchange relation with said condenser; and circuit means to automatically control the duration of the passage of power during each cycle of alternating current to said fan motor in accordance with the temperature sensed by said temperature sensor to limit the effective power supplied to said motor in a manner so as to limit the fan speed to a speed which provides at least a predetermined minimum condensing temperature by limiting the quantity of air passed over said refrigerant condenser by said fan.

10. A refrigeration system comprising a condenser; a fan arranged for passing air over said condenser to condense refrigerant therein; a fan motor arranged to drive said fan, switch means arranged to control the passage of current through said fan motor, said switch including actuating means to trigger said switch to a conducting state; temperature responsive means disposed in heat exchange relation with said condenser; a transistor having an emitter; means providing a voltage which is a sum of a function of said sensed temperature and a function of time on said emitter of said transistor; conductor means to conduct a current output from said transistor to actuate said switch means to a conducting state from a signal output of said transistor; and means to render said switch means periodically non-conducting, so as to limit the effective power supplied to said fan motor to an amount which results in a fan speed which provides at least a predetermined desired minimum condensing temperature.

11. A refrigeration system comprising a refrigerant condenser; a condenser fan arranged to pass air over said refrigerant condenser to condense refrigerant therein; a fan motor arranged to drive said fan; and a control circuit for controlling the speed of said fan, said circuit including a temperature sensor secured to said refrigerant condenser in heat exchange relation therewith, switch means arranged to control the passage of power to said fan motor, means to provide a bias voltage which is a function of the sensed temperature and having a magnitude which is insufficient to trigger said switch to a conducting state, means to add a periodic voltage which is a function of time to said bias voltage to trigger said switch means to a conducting state, and means to periodically render said switch non-conducting so as to limit the effective power supplied to said fan motor to an amount which will limit the fan speed and the corresponding quality of air passed over said condenser to an amount which will provide at least a predetermined minimum condensing temperature.

References Cited

UNITED STATES PATENTS

| 2,705,404 | 4/1955 | Malutich | 62—184 |
| 3,107,285 | 10/1963 | Knapp | 219—501 |
| 3,149,224 | 9/1964 | Horne et al. | 219—501 X |
| 3,161,782 | 12/1964 | Vieth | 307—88.5 |
| 3,196,629 | 7/1965 | Wood | 62—183 |

WILLIAM J. WYE, Primary Examiner

U.S. Cl. X.R.

62—181; 219—501; 230—114; 236—74, 78; 318—334, 345